United States Patent
Inoue et al.

(10) Patent No.: US 6,935,477 B2
(45) Date of Patent: Aug. 30, 2005

(54) MAGNET TYPE CLUTCH DEVICE OR MAGNET TYPE FAN CLUTCH DEVICE

(75) Inventors: Hiroshi Inoue, Numazu (JP); Ken Shiozaki, Shizuoka (JP)

(73) Assignee: Usui Kokusai Sangyo Kaisha Limited (JP)

( * ) Notice: Subject to any disclaimer, the term of this patent is extended or adjusted under 35 U.S.C. 154(b) by 15 days.

(21) Appl. No.: 10/723,557

(22) Filed: Nov. 24, 2003

(65) Prior Publication Data

US 2004/0118656 A1 Jun. 24, 2004

(30) Foreign Application Priority Data

Nov. 28, 2002 (JP) ........................................ 2002-345018
Oct. 28, 2003 (JP) ........................................ 2003-367937

(51) Int. Cl.$^7$ ............................................. F16D 27/01
(52) U.S. Cl. ................................... 192/48.2; 192/84.31
(58) Field of Search ............................ 192/48.2, 84.31

(56) References Cited

U.S. PATENT DOCUMENTS 4,926,992 A * 5/1990 Linnig ....................... 192/48.2
6,013,003 A * 1/2000 Boffelli et al. .............. 475/149
6,468,163 B1 * 10/2002 Boffelli et al. ................ 464/29
6,520,304 B2 * 2/2003 Bellotti et al. ............. 192/48.2
6,598,720 B2 * 7/2003 Ritter et al. ............... 192/48.2
6,634,476 B2    10/2003 Inoue et al.

* cited by examiner

*Primary Examiner*—Richard M. Lorence
(74) *Attorney, Agent, or Firm*—Gerald E. Hespos; Anthony J. Casella (57) ABSTRACT

The invention provides a magnet type clutch device or a magnet type fan clutch device able to arbitrarily change the rotation speed of a fan by switching and controlling the directions of magnetic fluxes of a permanent magnet and an electromagnetic clutch. The magnet type clutch device or the magnet type fan clutch device constructed by integrating the electromagnetic clutch and a magnet coupling using the permanent magnet is characterized in that a magnetic loop element is assembled into a permanent magnet rotating body and the rotation speed of the fan, etc. can be changed by switching and controlling the magnetic flux direction of the electromagnetic clutch.

10 Claims, 6 Drawing Sheets

MAGNET TYPE CLUTCH DEVICE OR MAGNET TYPE FAN CLUTCH DEVICE

BACKGROUND OF THE INVENTION

1. Field of the Invention

The present invention relates to a magnet type clutch device or a magnet type fan clutch device, etc. for a variable torque clutch of a transmission device for general industry, and a magnet type clutch device or a magnet type fan clutch device, etc. of low noises for controlling the rotation of a cooling fan applied to an internal combustion engine for a vehicle.

2. Description of Related Art

The magnet type fan clutch device constructed by integrating a magnet coupling and an electromagnetic clutch is already proposed as a fan clutch for controlling the rotation of the cooling fan (hereinafter simply called the fan) applied to the internal combustion engine for a vehicle, etc. (JP-A-2002-195303, etc.). In the magnet type fan clutch device of this kind, the magnet coupling and the electromagnetic clutch are combined with each other, and the fan is attached to the magnet coupling side. Concretely, for example, the magnet type fan clutch device is constructed by the rotatable electromagnetic clutch constructed by an armature and a clutch rotor having a magnetizing coil therein supported by a drive shaft or a fixing shaft, and is also constructed by the magnet coupling having a permanent magnet rotating body attaching the fan to its outer circumference, and a hysteresis material or a conductor arranged so as to be opposed to this permanent magnet with a slight gap therebetween. This magnet coupling is constructed such that the permanent magnet rotating body and the above disk are integrally rotated by an attractive action taken between the above permanent magnet and the hysteresis material or the conductor. This magnet type fan clutch device is constructed so as to control the operation of the above magnet coupling such that the magnet coupling is turned ON/OFF by the above electromagnetic clutch.

In the case of the magnet type fan clutch device of such a construction, when the magnetizing coil of the electromagnetic clutch is turned ON, the armature is attracted and adsorbed to the clutch rotor and the clutch rotor, the armature and the disk or a driven side housing are integrally rotated so that the fan is rotated by the magnet coupling. Therefore, the following excellent effects, etc. are obtained. Namely, the fan rotation can be controlled by turning ON/OFF the electromagnetic clutch. Further, since the ON/OFF of the electromagnetic clutch is controlled in association with the temperature of cooling water, a throttle aperture, the rotation speed of an engine and an air conditioner switch, the fan rotation can be controlled precisely and stably. Furthermore, when the fan is rotated by the magnet coupling, the magnet coupling transmits the rotation torque by the magnetic force of the permanent magnet so that the magnet coupling is slipped and a cushion start is made. Therefore, when the electromagnetic clutch begins to be turned ON, load is small and fan noises can be greatly reduced in comparison with a fan clutch device having no magnet coupling.

However, in the conventional magnet type fan clutch device, the magnet coupling is constructed by the permanent magnet rotating body and the permanent magnet mounted to this rotating body, and no directions of magnet fluxes of the permanent magnet and the electromagnetic clutch can be switched and controlled. Therefore, the conventional magnet type fan clutch device has the disadvantages that no rotation speed of the fan can be arbitrarily changed.

SUMMARY OF THE INVENTION

The object of present invention is made to solve the above problem, and provides a magnet type clutch device or a magnet type fan clutch device able to arbitrarily change the rotation speed of an output shaft of the fan, etc. by switching and controlling the directions of the magnetic fluxes of the permanent magnet and the electromagnetic clutch.

A magnet type clutch device in the present invention is characterized in that the magnet type clutch device is constructed by combining a magnet coupling and an electromagnetic clutch wherein the electromagnetic clutch is constructed by a magnetizing coil arranged within a clutch rotor fixed to an input shaft, and the magnet coupling has a permanent magnet rotating body rotatably supported by an output shaft, an armature held by this rotating body so as to be moved forward and backward, a disk fixed to the output shaft, and a conductor or a hysteresis material attached to the disk so as to be opposed to the permanent magnet mounted to the permanent magnet rotating body with a slight gap therebetween, and is constructed so as to integrally rotate the permanent magnet rotating body and the disk by an attractive action taken between the permanent magnet and the conductor or the hysteresis material, and is controlled so as to be turned ON/OFF by the electromagnetic clutch; the improvement that the permanent magnet mounted to the permanent magnet rotating body is set to have multiple poles in the circumferential direction, and magnetic loop elements are alternately assembled in the circumferential direction on the inner and outer circumferential sides of each of the S and N poles, and the rotation speed of the disk can be changed by switching and controlling the direction of a magnetic flux of the electromagnetic clutch.

Here, it is also characterized in that the armature is held in the rotating body by a leaf spring so as to be moved forward and backward by predetermined distances. It is further characterized in that the permanent magnet rotating body is rotatably supported in the output shaft by a bearing device.

Further, a magnet type fan clutch device in the present invention is characterized in that the magnet type fan clutch device is constructed by combining a magnet coupling and an electromagnetic clutch and having a fan attached to the magnet coupling side wherein the electromagnetic clutch is constructed by a clutch rotor rotatably supported by a fixing shaft, and a magnetizing coil arranged within this rotor, and the magnet coupling has a permanent magnet rotating body rotatably supported by the fixing shaft, an armature held by this rotating body so as to be moved forward and backward, a disk with a fan rotatably supported by the permanent magnet rotating body through a bearing device, and a conductor or a hysteresis material attached to the-disk so as to be opposed to the permanent magnet mounted to the permanent magnet rotating body with a slight gap therebetween, and is constructed so as to integrally rotate the permanent magnet rotating body and the disk by an attractive action taken between the permanent magnet and the conductor or the hysteresis material, and is controlled so as to be turned ON/OFF by the electromagnetic clutch; the improvement that the permanent magnet mounted to the permanent magnet rotating body is set to have multiple poles in the circumferential direction, and magnetic loop elements are alternately assembled in the circumferential direction on the inner and outer circumferential sides of each of the S and N poles, and the rotation speed of the disk with the fan can be changed by switching and controlling the direction of a magnetic flux of the electromagnetic clutch. Here, it is also characterized in that the armature is held in the rotating body by a leaf spring so as to be moved forward and backward by predetermined distances. Further, it is characterized in that the clutch rotor and the permanent magnet rotating body are rotatably supported by the fixing shaft through a bearing device.

In the magnet type clutch device or the magnet type fan clutch device in the present invention, the rotation speed of the output shaft such as a fan, etc. can be arbitrarily changed only by switching and controlling the directions of the magnetic fluxes of the permanent magnet and the electromagnetic clutch. Accordingly, fan noises are reduced and fuel cost is improved and the electromagnetic clutch is made compact and cost is reduced.

DESCRIPTION OF THE PREFERRED EMBODIMENTS

In FIGS. 1 to 5, reference numerals 1, 11 and 2 respectively designate an input shaft, an output shaft and a fixing shaft. Reference numerals 3, 13 designate electromagnetic clutches. Reference numerals 4, 14 designate magnet couplings. Reference numerals 5, 15a, 15b designate magnetic loop elements. Reference numerals 6, 16 designate armatures.

Figure 1:
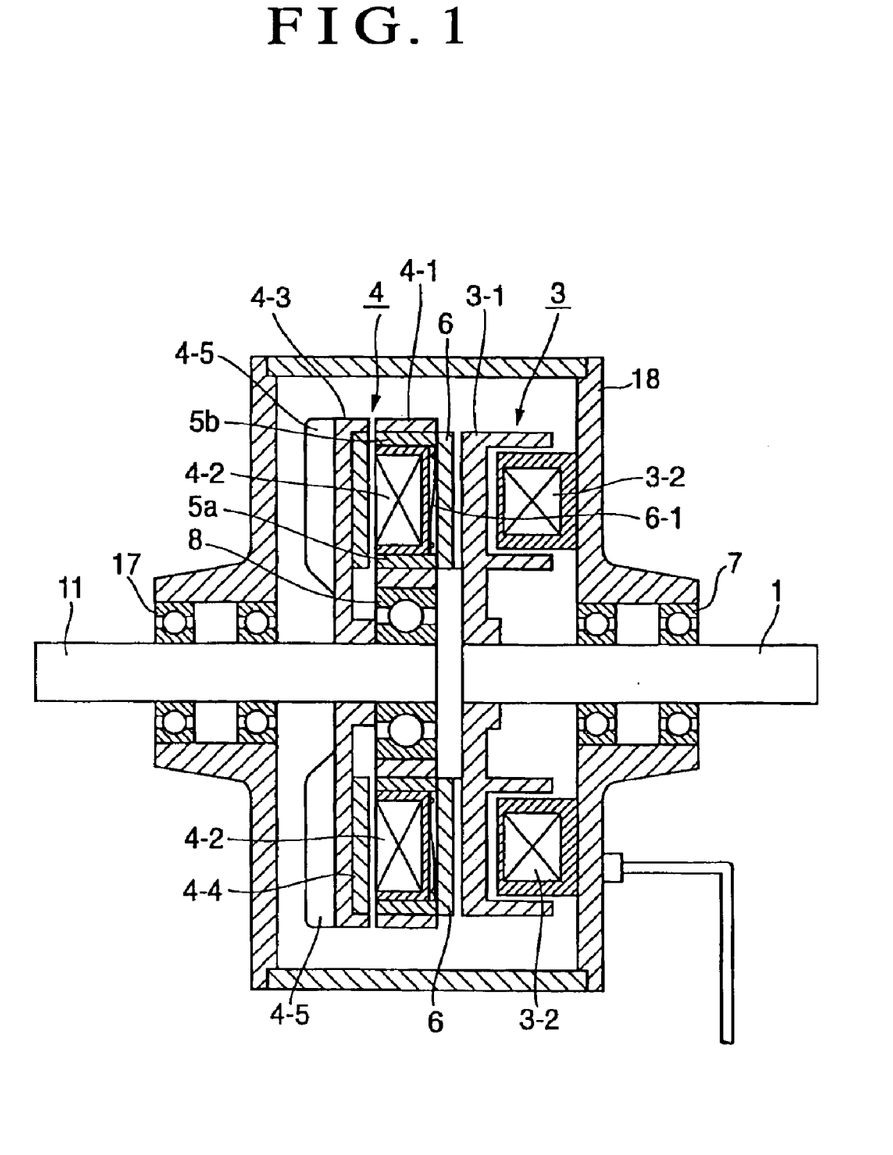
FIG. 1 is a longitudinal sectional side view showing one embodiment of a magnet type clutch device in the present invention.

The magnet type clutch device shown in FIG. 1 has a structure in which the electromagnetic clutch 3 is attached to the input shaft 1 and the magnet coupling 4 is attached to the output shaft 11, and the electromagnetic clutch 3 and the magnet coupling 4 are surrounded by a case 18 rotatably supported by the input shaft 1 and the output shaft 11 through bearing devices 7, 17. The above electromagnetic clutch 3 is constructed by a clutch rotor 3-1 fixed to the input shaft 1, and a magnetizing coil 3-2 fixed to the case 18 within this rotor. On the other hand, the magnet coupling 4 is constructed by a permanent magnet rotating body 4-1, a permanent magnet 4-2, magnetic loop elements 5a, 5b, an armature 6, a disk 4-3 with a fin 4-5, and a conductor 4-4 (or a hysteresis material) The permanent magnet rotating body 4-1 is rotatably supported by the output shaft 11 through a bearing device 8. The permanent magnet 4-2 is mounted to the rotating body and has multiple poles in the circumferential direction. The magnetic loop elements 5a, 5b are alternately arranged in the circumferential direction on the inner and outer circumferential face sides of the permanent magnet 4-2. The armature 6 is held in the above rotating body 4-1 by a leaf spring 6-1 so as to be moved forward and backward by predetermined distances. The disk 4-3 is fixed to the above output shaft 11. The conductor 4-4 is attached to the above disk 4-3 so as to be opposed to the permanent magnet 4-2 mounted to the above permanent magnet rotating body 4-1 with a slight gap therebetween. The permanent magnet rotating body 4-1 and the disk 4-3 having the above conductor 4-4 are relatively rotated by an attractive action taken between the above permanent magnet 4-2 and the conductor 4-4 and causing an eddy current.

In the magnet type clutch device of the above construction, when the electromagnetic clutch 3 is turned ON in a state in which the clutch rotor 3-1 is rotated integrally with the input shaft 1, the armature 6 is attracted by the magnetizing coil 3-2 mounted into the clutch rotor 3-1 and is adsorbed to the clutch rotor 3-1, and the clutch rotor 3-1 and the permanent magnet rotating body 4-1 are integrally rotated. When this permanent magnet rotating body 4-1 is rotated, the disk 4-3 is rotated integrally with the output shaft 11 by the attractive action using the eddy current caused between the permanent magnet 4-2 of the permanent magnet rotating body and the conductor 4-4 attached to the disk 4-3.

Figure 2:
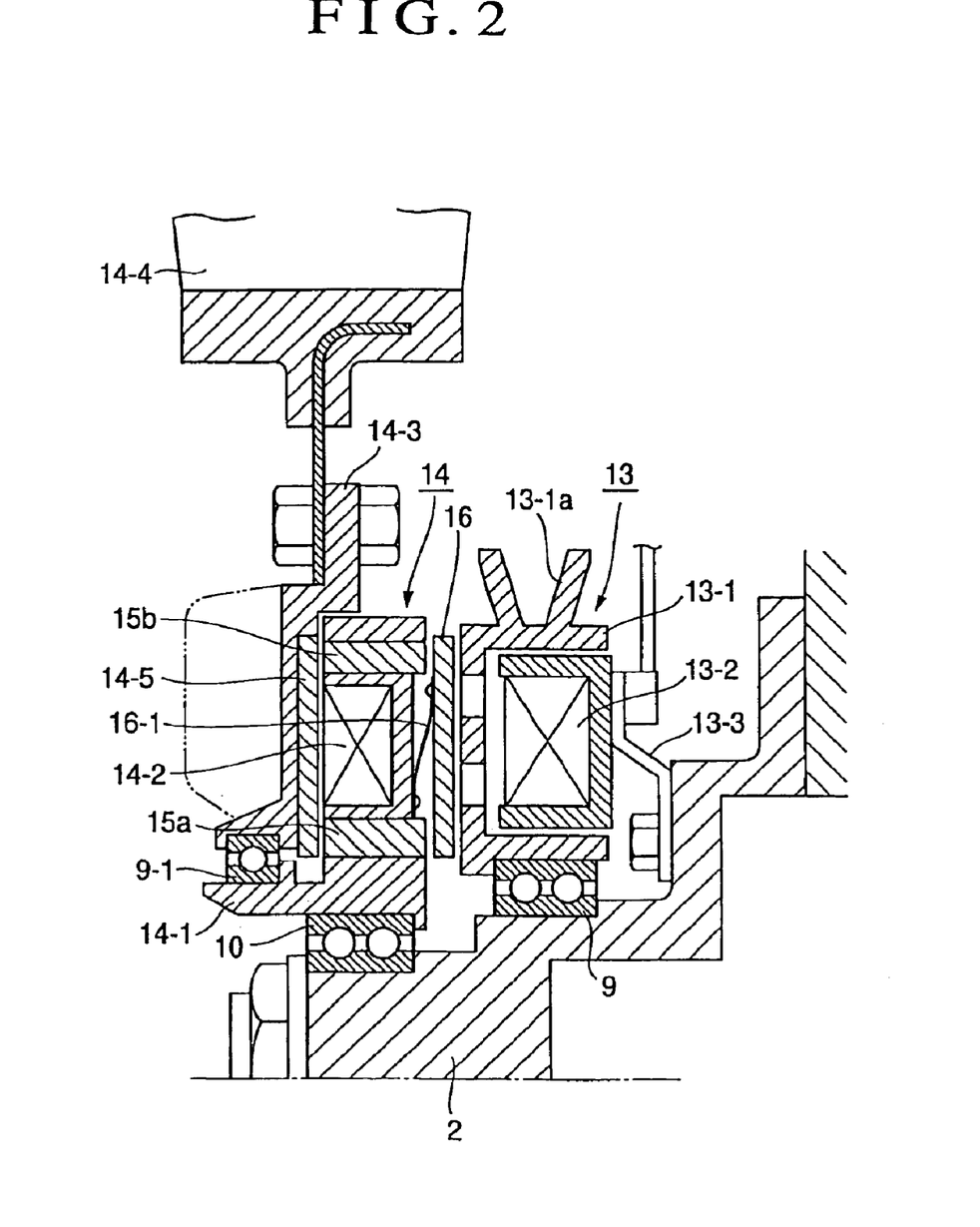
FIG. 2 is a half cut longitudinal sectional side view showing another embodiment of a magnet type fan clutch device in the present invention.
Figure 3:
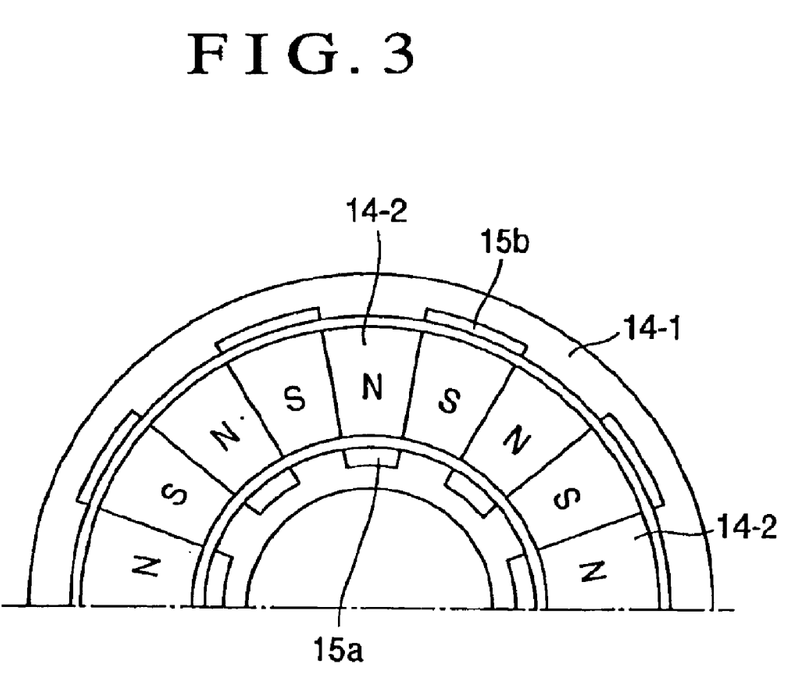
FIG. 3 is a partial front view of a permanent magnet rotating body showing the construction of an arrangement in which the permanent magnet of the magnet type fan clutch device shown in FIG. 2 has multiple poles in the circumferential direction.
Figure 4:
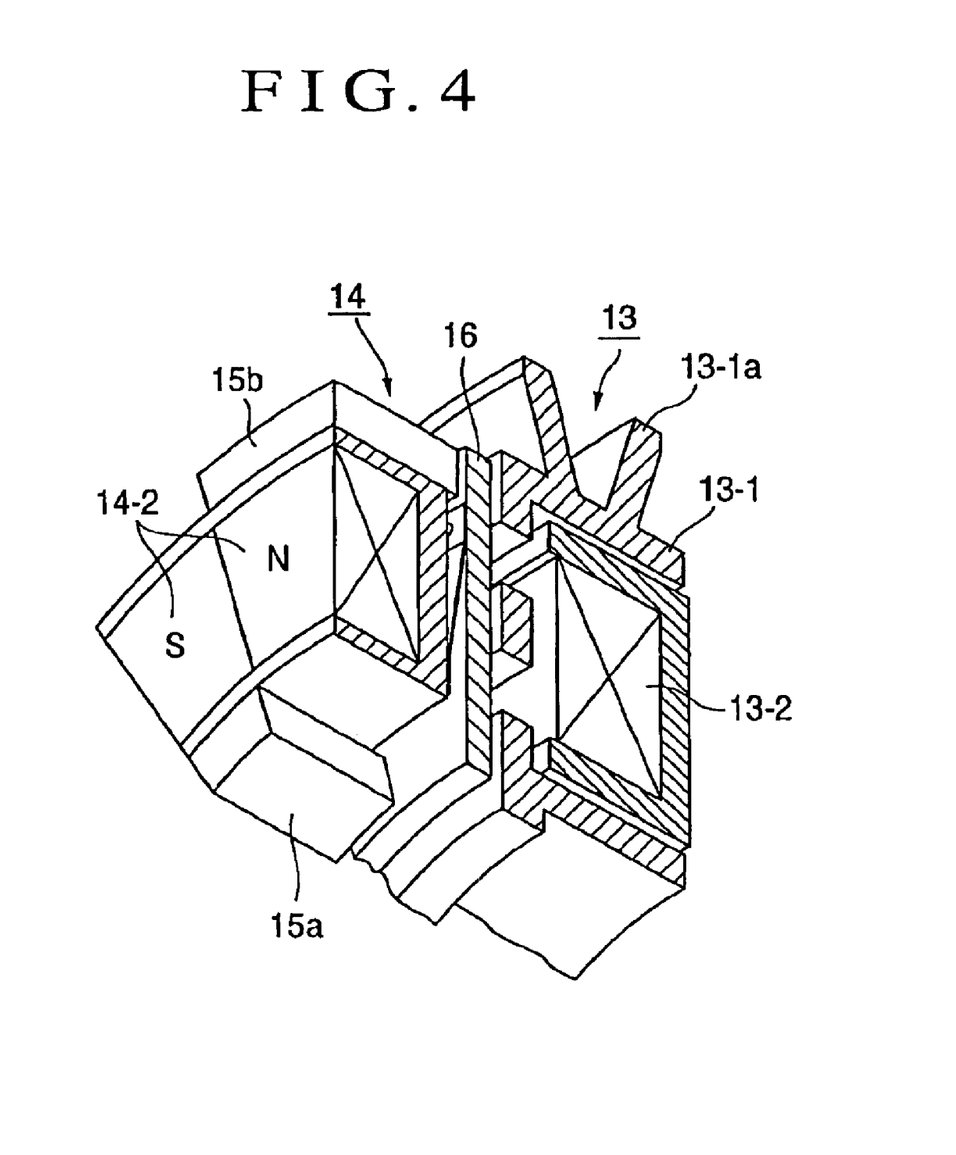
FIG. 4 is a partial perspective view enlarging and showing portions of a magnet coupling and an electromagnetic clutch of the magnet type fan clutch device shown in FIG. 2.

Next, the magnet type fan clutch device shown in FIGS. 2 to 4 is constructed by arranging an electromagnetic clutch 13 and a magnet coupling 14 in the fixing shaft 2 of non-rotation. The electromagnetic clutch 13 is constructed by a clutch rotor 13-1 with a pulley 13-1a and a magnetizing coil 13-2. The clutch rotor 13-1 is rotatably supported by the fixing shaft 2 through a bearing device 9. The magnetizing coil 13-2 is fitted into this clutch rotor 13-1 and is fixed to the fixing shaft 2 through a stay 13-3. On the other hand, the magnet coupling 14 is constructed by a permanent magnet rotating body 14-1, a permanent magnet 14-2, an armature 16, a disk 14-3 with a fan 14-4, and a conductor 14-5 (or a hysteresis material). The permanent magnet rotating body 14-1 is rotatably supported by the fixing shaft 2 through a bearing device 10. The permanent magnet 14-2 is mounted to the permanent magnet rotating body 14-1. The armature 16 is held in the above rotating body 14-1 by a leaf spring 16-1 so as to be moved forward and backward by predetermined distances. The disk 14-3 is rotatably supported by the above rotating body 14-1 through a bearing device 9-1. The conductor 14-5 is attached to the above disk 14-3 so as to be opposed to the permanent magnet 14-2 mounted to the above permanent magnet rotating body 14-1 with a slight gap therebetween. The permanent magnet rotating body 14-1 and the disk 14-3 having the above conductor 14-5 are relatively rotated by the attractive action using the eddy current caused between the above permanent magnet 14-2 and the conductor 14-5.

The permanent magnet 14-2 of the magnet coupling 14 in this magnet type fan clutch device has a multiple pole structure in the circumferential direction as shown in FIGS. 3 and 4. Namely, the permanent magnet of a divisional structure is arranged such that the N and S poles are alternately arranged in the circumferential direction on the circular circumference of the permanent magnet rotating body 14-1. Further, the magnetic loop elements 15a, 15b are alternately attached to the inner and outer circumferential face sides of each magnet in the circumferential direction.

In the magnet type fan clutch device shown in FIGS. 2 to 4, when the electromagnetic clutch 13 is turned ON in a state in which the clutch rotor 13-1 is rotated through-the pulley 13-1a, the armature 16 held in the permanent magnet rotating body 14-1 so as to be moved forward and backward is attracted by the magnetizing coil 13-2 fixed to the fixing shaft 2 through the stay 13-3 and is adsorbed to the clutch rotor 13-1 so that the clutch rotor 13-1 and the permanent magnet rotating body 14-1 are integrally rotated. When this permanent magnet rotating body 14-1 is rotated, the disk 14-3 is rotated by the attractive action using-the eddy current caused between the permanent magnet 14-2 of the permanent magnet rotating body 14-1 and the conductor 14-5 attached to the disk 14-3 so that the fan 14-4 is rotated.

Figure 5A:
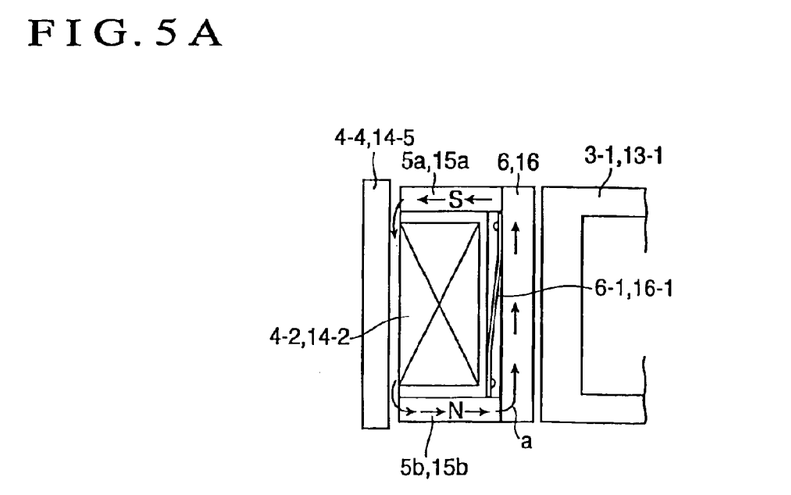
FIGS. 5A to 5C are respectively schematic explanatory views showing the flow of a magnetic flux when the electromagnetic clutch in the magnet type clutch device of the present invention is turned ON and OFF.

The operation of the magnet type clutch device or the magnet type fan clutch device shown in each of the above FIGS. 1 and 2 to 4 will be explained on the basis of FIG. 5 when the electromagnetic clutch is turned ON and OFF. First, when the electromagnetic clutch is turned off, the magnetic fluxes of the permanent magnets 4-2, 14-2 are flowed to the armatures 6, 16 as shown by an arrow a in FIG. 5A. However, since no armatures 6, 16 are moved onto the electromagnetic clutch side, only the clutch rotors 3-1, 13-1 are rotated and the disks 4-3, 14-4 are in a non-rotating state.

Figure 5B:
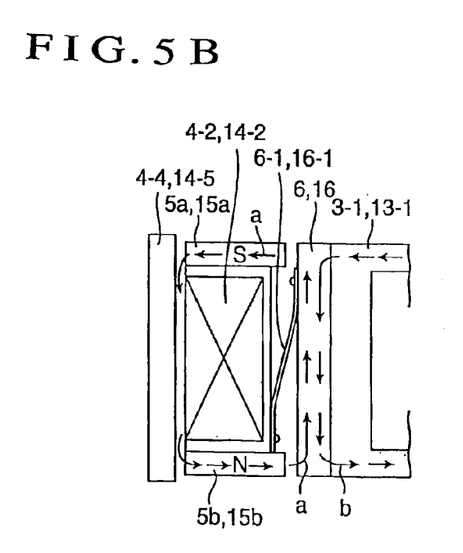

Next, when the electromagnetic clutch is turned ON, the magnetic fluxes are flowed to the clutch rotors 3-1, 13-1 as shown by an arrow b in FIG. 5B, and the armatures 6, 16 are adsorbed onto the clutch rotor side, and the clutch rotors 3-1, 13-1 and the permanent magnets 4-2, 14-2 are integrally rotated. In this case, when the directions (arrow a) of the magnetic flukes flowed from the permanent magnets 4-2, 14-2 and the directions (arrow b) of the magnetic fluxes of the electromagnetic clutches 3, 13 are reversely set as shown in these figures, the magnetic fluxes flowed to the sides of the conductors 4-4, 14-5 are minimized and the fan rotating speed becomes minimum. On the other hand, when the directions (arrow a) of the magnetic fluxes flowed from the permanent magnets 4-2, 14-2 and the magnetic flux directions (arrow b) of the electromagnetic clutches 3, 13 are set to the same as shown in FIG. 5C, the magnetic fluxes flowed to the sides of the conductors 4-4, 14-5 become maximum and the fan rotating speed becomes maximum.

Figure 5C:
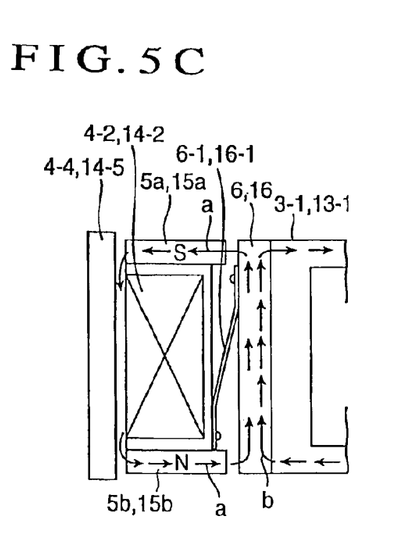
Figure 6:
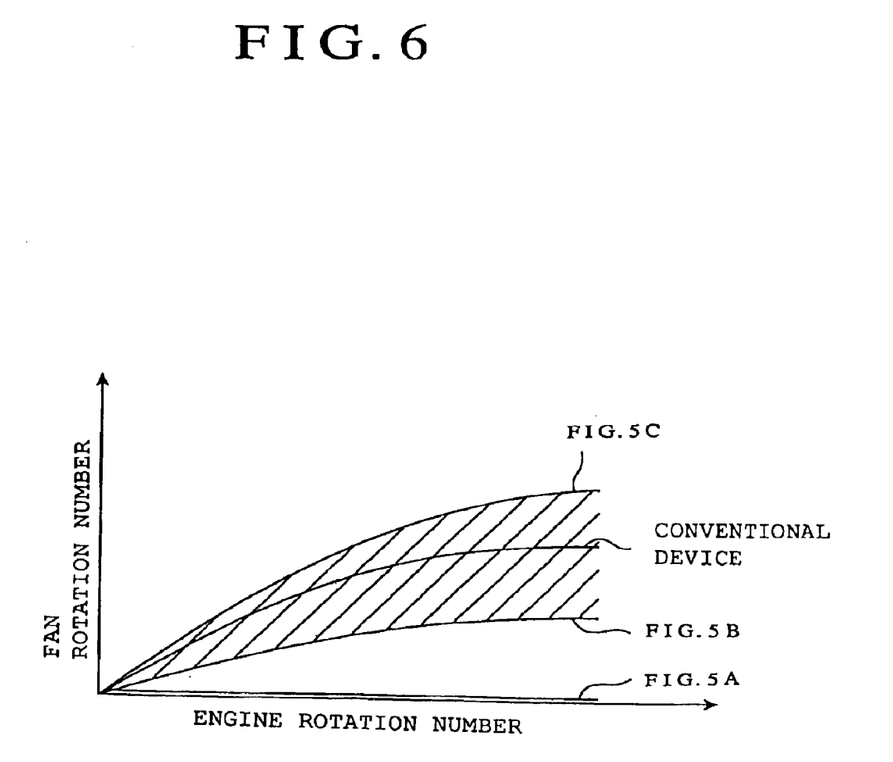
FIG. 6 is a graph showing fan rotating characteristics of the magnet type fan clutch device of the present invention in comparison with the conventional case.

Namely, in the case of the magnet type clutch device or the magnet type fan clutch device of the present invention, the rotation speed of the fan can be freely changed by switching the magnetic flux directions of the electromagnetic clutches and controlling the electric current values with respect to the fan rotating characteristics as shown in FIG. 6 in the zone (oblique line portion) between the fan rotation speed when the directions (arrow a) of the magnetic fluxes flowed from the permanent magnets 4-2, 14-2 at the turning-on time of the electromagnetic clutches and the magnetic flux directions (arrow b) of the electromagnetic clutches 3, 13 are set to be reverse to each other (FIG. 5B), and the fan rotation speed when the directions (arrow a) of the magnetic fluxes flowed from the permanent magnets 4-2, 14-2 and the magnetic flux directions (arrow b) of the electromagnetic clutches 3, 13 are set to the same (FIG. 5C).

The device in the present invention can be also applied as a variable torque clutch of a general purpose machine as well as the magnet type clutch device or the magnet type fan clutch device, etc. for a variable torque clutch of a transmission device for general industry, and the magnet type clutch device or the magnet type fan clutch device, etc. of low noises for controlling the rotation of a cooling fan applied to an internal combustion engine for a vehicle.

What is claimed is:

1. In a magnet type clutch device constructed by combining a magnet coupling and an electromagnetic clutch wherein the electromagnetic clutch is constructed by a magnetizing coil arranged within a clutch rotor fixed to an input shaft, and the magnet coupling has a permanent magnet rotating body rotatably supported by an output shaft, an armature held by this rotating body so as to be moved forward and backward, a disk fixed to said output shaft, and a conductor or a hysteresis material attached to said disk so as to be opposed to a permanent magnet mounted to said permanent magnet rotating body with a slight gap therebetween, and is constructed so as to integrally rotate the permanent magnet rotating body and said disk by an attractive action taken between said permanent magnet and the conductor or the hysteresis material, and is controlled so as to be turned ON/OFF by said electromagnetic clutch; the improvement that the permanent magnet mounted to said permanent magnet rotating body is set to have multiple poles in a circumferential direction, and magnetic loop elements are alternately assembled in the circumferential direction on inner and outer circumferential sides of each of S and N poles, and a rotation speed of said disk can be changed by switching and controlling the direction of a magnetic flux of said electromagnetic clutch.

2. The magnet type clutch device according to claim 1, wherein said armature is held in said rotating body by a leaf spring so as to be moved forward and backward by predetermined distances.

3. The magnet type clutch device according to claim 2, wherein said permanent magnet rotating body is rotatably supported in said output shaft by a bearing device.

4. The magnet type clutch device according to claim 1, wherein said permanent magnet rotating body is rotatably supported in said output shaft by a bearing device.

5. In a magnet type fan clutch device constructed by combining a magnet coupling and an electromagnetic clutch and having a fan attached to the magnet coupling side wherein the electromagnetic clutch is constructed by a clutch rotor rotatably supported by a fixing shaft, and a magnetizing coil arranged within this rotor, and the magnet coupling has a permanent magnet rotating body rotatably supported by said fixing shaft, an armature held by this rotating body so as to be moved forward and backward, a disk with the fan rotatably supported by said permanent magnet rotating body, and a conductor or a hysteresis material attached to said disk so as to be opposed to a permanent magnet mounted to said permanent magnet rotating body with a slight gap therebetween, and is constructed so as to integrally rotate the permanent magnet rotating body and said disk by an attractive action taken between said permanent magnet and the conductor or the hysteresis material, and is controlled so as to be turned ON/OFF by said electromagnetic clutch; the improvement that the permanent magnet mounted to said permanent magnet rotating body is set to have multiple poles in the circumferential direction, and magnetic loop elements are alternately assembled in the circumferential direction on inner and outer circumferential sides of each of S and N poles, and the rotation speed of said disk with the fan can be changed by switching and controlling the direction of a magnetic flux of said electromagnetic clutch.

6. The magnet type fan clutch device according to claim 5, wherein said armature is held in said rotating body by a leaf spring so as to be moved forward and backward by predetermined distances.

7. The magnet type fan clutch device according to claim 6, wherein said clutch rotor and said permanent magnet rotating body are rotatably supported by said fixing shaft through bearing devices.

8. The magnet type fan clutch device according to claim 6, wherein the N and S poles of the permanent magnet of a divisional structure are alternately arranged on a circular circumference of said permanent magnet rotating body, and the magnetic loop elements are alternately attached onto inner and outer circumferential face sides of each magnet.

9. The magnet type fan clutch device according to claim 5, wherein said clutch rotor and said permanent magnet rotating body are rotatably supported by said fixing shaft through bearing devices.

10. The magnet type fan clutch device according to claim 5, wherein the N and S poles of the permanent magnet of a divisional structure are alternately arranged on a circular circumference of said permanent magnet rotating body, and the magnetic loop elements are alternately attached onto inner and outer circumferential face sides of each magnet.

* * * * *